United States Patent
Hargrove

Patent Number: 5,960,100
Date of Patent: Sep. 28, 1999

[54] CREDIT CARD READER WITH THUMB PRINT VERIFICATION MEANS

[76] Inventor: Tom Hargrove, 1567 #1 Fairfield St., Ontario, Calif. 91761

[21] Appl. No.: 08/899,071
[22] Filed: Jul. 23, 1997
[51] Int. Cl.⁶ .................................................. G06K 9/20
[52] U.S. Cl. ...................... 382/124; 340/825.34; 705/18; 235/382; 283/69
[58] Field of Search ........................... 382/116, 124–127; 340/825.34; D14/107, 116; 705/17, 18, 41; 235/382, 382.5, 440, 449, 450, 454; 356/71; 283/68, 69, 78; 902/4–6, 22

[56] References Cited

U.S. PATENT DOCUMENTS

| | | | |
|---|---|---|---|
| D. 348,445 | 7/1994 | Fishbine et al. | D14/107 |
| D. 351,144 | 10/1994 | Fishbine et al. | D14/107 |
| D. 389,817 | 1/1998 | Umetsu | D14/107 |
| 3,617,120 | 11/1971 | Roka | 353/28 |
| 3,928,842 | 12/1975 | Green et al. | 340/146.3 Q |
| 4,202,120 | 5/1980 | Engel | 40/2.2 |
| 4,455,083 | 6/1984 | Elmes | 356/71 |
| 4,995,086 | 2/1991 | Lilley et al. | 382/124 |
| 5,467,403 | 11/1995 | Fishbine et al. | 382/116 |
| 5,473,144 | 12/1995 | Mathurin, Jr. | 235/380 |
| 5,513,272 | 4/1996 | Bogosian, Jr. | 382/116 |
| 5,642,160 | 6/1997 | Bennett | 348/156 |
| 5,756,978 | 5/1998 | Soltesz et al. | 235/380 |
| 5,790,674 | 8/1998 | Houvener et al. | 380/23 |

FOREIGN PATENT DOCUMENTS 2290053  12/1995  United Kingdom  ........... B42D 15/10

*Primary Examiner*—Jose L. Couso
*Assistant Examiner*—Brian P. Werner

[57] ABSTRACT

A credit card reader with thumb print verification means is provided including a credit card having a thin magnetic strip with an account number stored thereon and a thumb print image. Also included is an alert mechanism for providing an indication upon the actuation thereof. A first camera is included to scan the thumb print image of the credit card upon the receipt of an activation signal. Associated therewith is a second camera adapted to scan a thumb print of a person upon the receipt of the activation signal and the user placing a thumb thereon. An activation mechanism is connected to the first camera and the second camera for transmitting the activation signal thereto upon the depression thereof. Finally, an image comparison mechanism is adapted to compare the thumb print of the user and the thumb print image upon the receipt thereof from the cameras. Further, the image comparison mechanism serves to actuate the alert mechanism upon the successful verification of the thumb print of the person with the thumb print image.

8 Claims, 2 Drawing Sheets

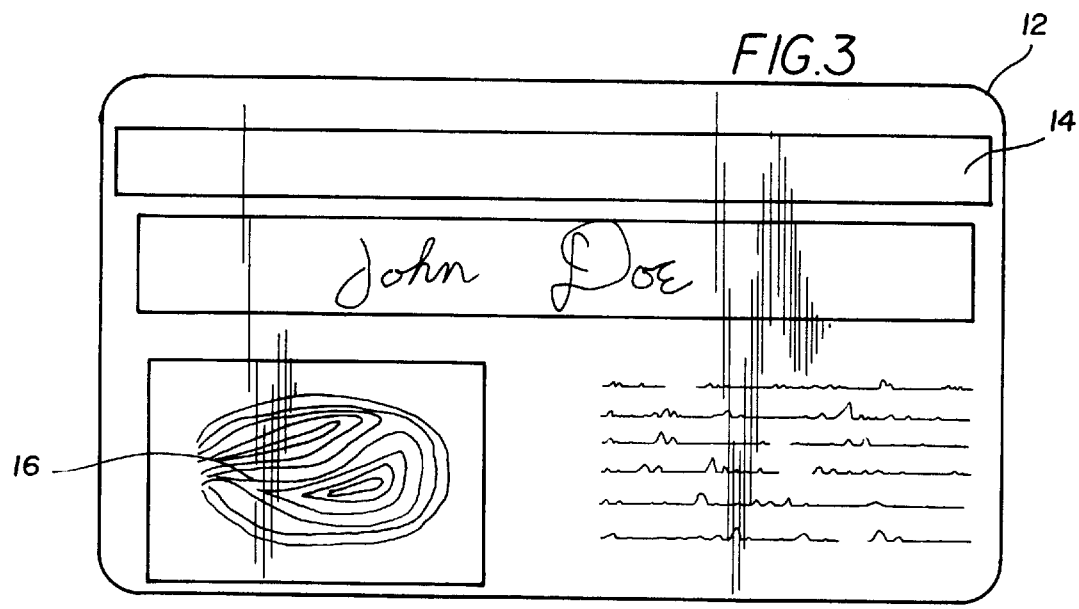
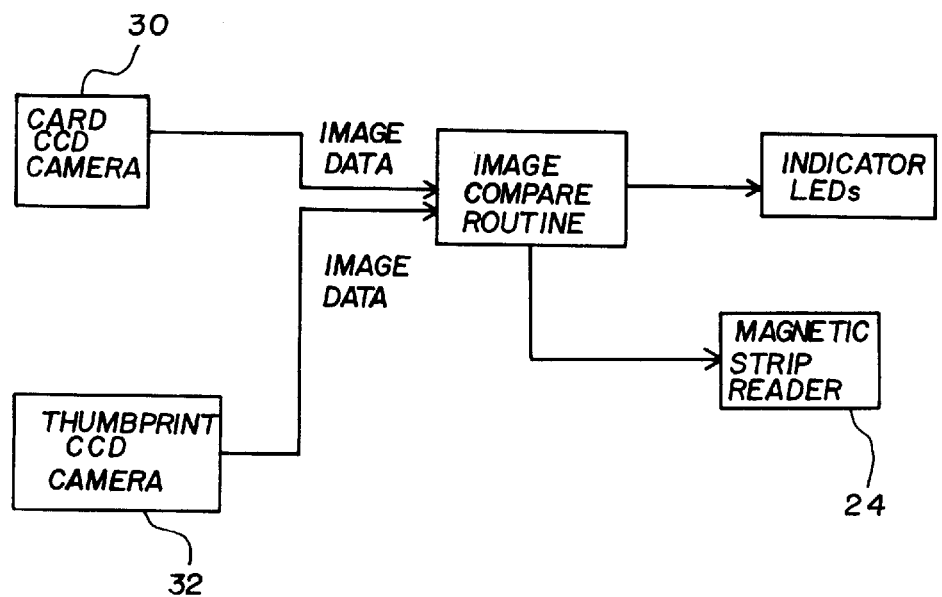

CREDIT CARD READER WITH THUMB PRINT VERIFICATION MEANS

BACKGROUND OF THE INVENTION

1. Field of the Invention

The present invention relates to a credit card reader with thumb print verification means and more particularly pertains to requiring the verification of a thumb print prior to permitting a purchase with a credit card.

2. Description of the Prior Art

The use of thumb print readers is known in the prior art. More specifically, thumb print readers heretofore devised and utilized for the purpose of scanning a thumbprint are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 5,053,608; U.S. Pat. No. 4,253,086; U.S. Pat. No. Des. 348,445; U.S. Pat. No. 5,365,586; U.S. Pat. No. 5,363,453; and U.S. Pat. No. 5,095,194.

In this respect, the credit card reader with thumb print verification means according to the present invention substantially departs from the conventional concepts and designs of the prior art, and in so doing provides an apparatus primarily developed for the purpose of permitting a purchase with a credit card.

Therefore, it can be appreciated that there exists a continuing need for a new and improved credit card reader with thumb print verification means which can be used for permitting a purchase with a credit card. In this regard, the present invention substantially fulfills this need.

SUMMARY OF THE INVENTION

In view of the foregoing disadvantages inherent in the known types of thumb print readers now present in the prior art, the present invention provides an improved credit card reader with thumb print verification means. As such, the general purpose of the present invention, which will be described subsequently in greater detail, is to provide a new and improved credit card reader with thumb print verification means which has all the advantages of the prior art and none of the disadvantages.

To attain this, the present invention essentially comprises a credit card having a thin rectangular configuration with a top face, a bottom face and a predetermined thickness. As shown in FIG. 3, the bottom face of the credit card has a thin magnetic strip with an account number stored thereon. Further shown is a thumb print image situated adjacent magnet strip. Next provided is a housing having a rectilinear configuration. As shown in FIGS. 1 & 2, the housing is equipped with a top face, a bottom face, and a periphery formed therebetween defining an interior space. The top face of the housing has a rectangular recess formed therein with the predetermined thickness. The top face further has a finger divot formed therein adjacent to and in communication with the rectangular recess. By this structure, the credit card may be placed within the recess with the bottom face thereof down and easily removed by way of the finger divot. Situated within the recess of the housing is a magnetic strip reader. The magnetic strip reader is adapted for reading an account number from the magnetic strip of the credit card upon the actuation thereof. For reasons that will become apparent later, a green light emitting diode is situated on the front face of the housing. Such diode is adapted to illuminate upon the actuation thereof. Associated therewith is a red light emitting diode situated on the front face of the housing. Similar to the green light emitting diode, the red light emitting diode is adapted to illuminate upon the actuation thereof. Next provided is a first charge controlled device camera situated within the recess of the housing adjacent the magnetic strip reader. The first charge controlled device camera is adapted to scan the thumb print image of the credit card upon the receipt of an activation signal. Also included is a second charge controlled device camera situated on the front face of the housing adjacent the recess thereof. Upon the receipt of the activation signal and the user placing a thumb thereon, the second charge controlled device camera is adapted to scan a thumb print of a person. Next provided is an activation button situated on the top face of the housing and connected to the first charge controlled device camera and the second charge controlled device camera. In use, the activation button serves to transmit the activation signal thereto upon the depression thereof. Finally, an image comparison means is situated within the housing and connected between the first charge controlled device camera, second charge controlled device camera, red light emitting diode, green light emitting diode, and the magnetic strip reader. In operation, the image comparison means is adapted to compare the thumb print of the user and the thumb print image upon the receipt thereof from the cameras. Upon such comparison, the image comparison means actuates the green light emitting diode and the magnetic strip reader if the verification of the thumb print of the person with the thumb print image is successful. Further, the image comparison means is adapted to actuate the red light emitting diode and preclude the actuation of the magnetic strip reader upon the unsuccessful verification of the thumb print of the person with the thumb print image.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved credit card reader with thumb print verification means which has all the advantages of the prior art thumb print readers and none of the disadvantages.

It is another object of the present invention to provide a new and improved credit card reader with thumb print verification means which may be easily and efficiently manufactured and marketed.

It is a further object of the present invention to provide a new and improved credit card reader with thumb print verification means which is of a durable and reliable construction.

An even further object of the present invention is to provide a new and improved credit card reader with thumb print verification means which is susceptible of a low cost of manufacture with regard to both materials and labor, and which accordingly is then susceptible of low prices of sale to the consuming public, thereby making such credit card reader with thumb print verification means economically available to the buying public.

Still yet another object of the present invention is to provide a new and improved credit card reader with thumb print verification means which provides in the apparatuses and methods of the prior art some of the advantages thereof, while simultaneously overcoming some of the disadvantages normally associated therewith.

Still another object of the present invention is to require the verification of a thumb print prior to permitting a purchase with a credit card.

Lastly, it is an object of the present invention to provide a new and improved a credit card having a thin magnetic strip with an account number stored thereon and a thumb print image. Also included is an alert mechanism for providing an indication upon the actuation thereof. A first camera is included to scan the thumb print image of the credit card upon the receipt of an activation signal. Associated therewith is a second camera adapted to scan a thumb print of a person upon the receipt of the activation signal and the user placing a thumb thereon. An activation mechanism is connected to the first camera and the second camera for transmitting the activation signal thereto upon the depression thereof. Finally, an image comparison mechanism is adapted to compare the thumb print of the user and the thumb print image upon the receipt thereof from the cameras. Further, the image comparison mechanism serves to actuate the alert mechanism upon the successful verification of the thumb print of the person with the thumb print image.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a rear view of the credit card of the present invention.

FIG. 4 is a schematic diagram depicting the various electrical components of the present invention.

Similar reference characters refer to similar parts throughout the several views of the drawings.

DESCRIPTION OF THE PREFERRED EMBODIMENT

Figure 1:
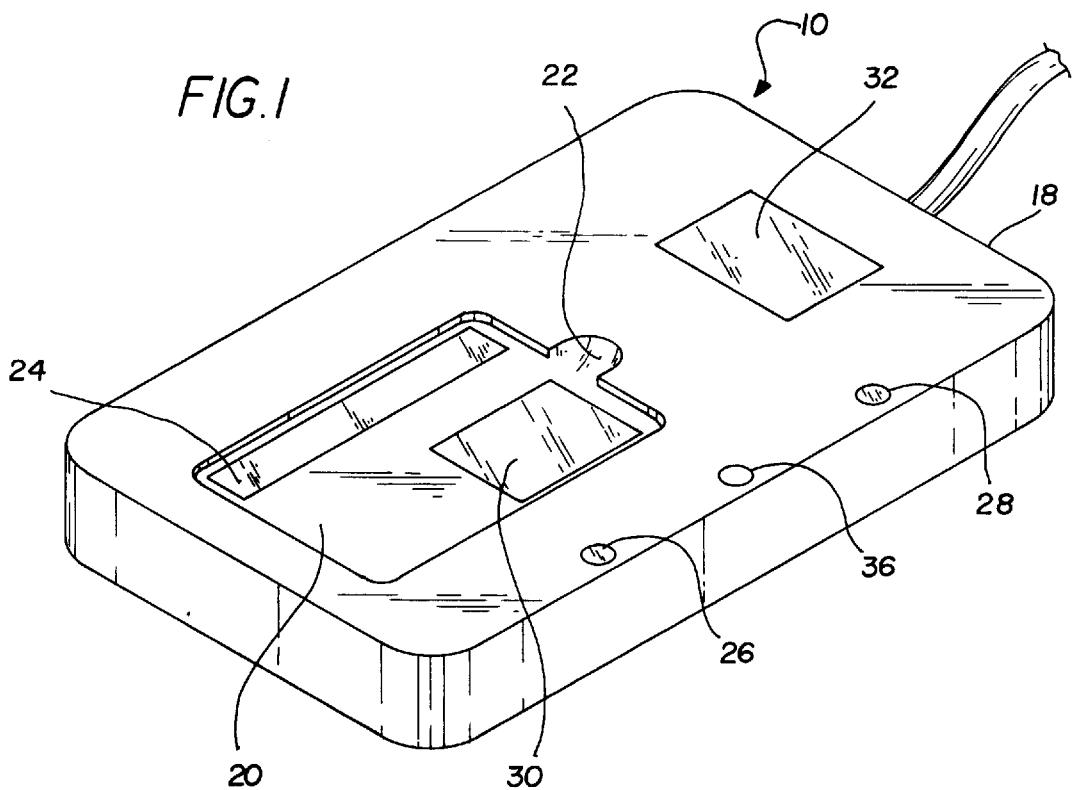
FIG. 1 is a perspective illustration of the preferred embodiment of the credit card reader with thumb print verification means constructed in accordance with the principles of the present invention.

With reference now to the drawings, and in particular to FIG. 1 thereof, a new and improved credit card reader with thumb print verification means embodying the principles and concepts of the present invention and generally designated by the reference numeral 10 will be described.

The present invention, the new and improved credit card reader with thumb print verification means, is comprised of a plurality of components. Such components in their broadest context include a specially adapted credit card, housing, first and second camera, light emitting diodes, magnetic strip reader, and image comparator means. Such components are individually configured and correlated with respect to each other so as to attain the desired objective.

More specifically, it will be noted that the system 10 of the present invention includes a credit card 12 having a thin rectangular configuration with a top face, a bottom face and a predetermined thickness. As shown in FIG. 3, the bottom face of the credit card has a thin magnetic strip 14 with an account number stored thereon. Further shown is a thumb print image 16 situated adjacent magnet strip.

Figure 2:
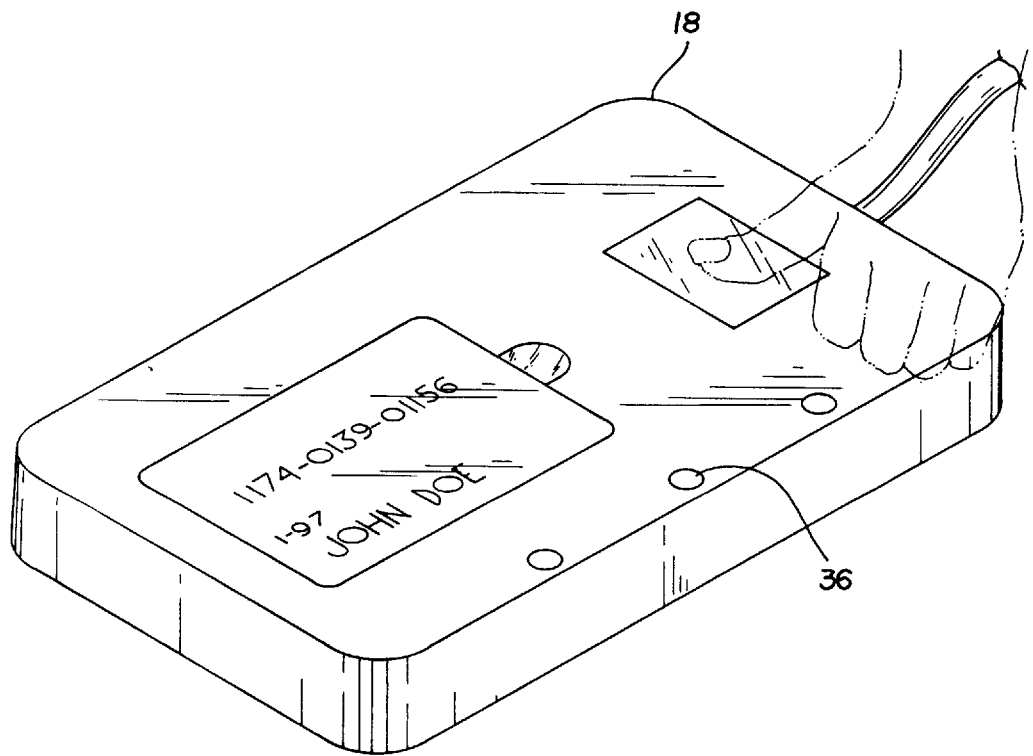
FIG. 2 is another perspective view of the present invention during the use thereof.

Next provided is a housing 18 having a rectilinear configuration. As shown in FIGS. 1 & 2, the housing is equipped with a top face, a bottom face, and a periphery formed therebetween defining an interior space. The top face of the housing has a rectangular recess 20 formed therein with depth equal to the predetermined thickness. The top face further has a finger divot 22 formed therein adjacent to and in communication with the rectangular recess. By this structure, the credit card may be placed within the recess with the bottom face thereof down and easily removed by way of the finger divot.

Situated within the recess of the housing is a magnetic strip reader 24. The magnetic strip reader is adapted for reading an account number from the magnetic strip of the credit card upon the actuation thereof. In the preferred embodiment, the magnetic strip reader is connected to a cash register via a cable 25 for transmitting the account number thereto after it is read.

For reasons that will become apparent later, a green light emitting diode 26 is situated on the front face of the housing. Such diode is adapted to illuminate upon the actuation thereof. Associated therewith is a red light emitting diode 28 situated on the front face of the housing. Similar to the green light emitting diode, the red light emitting diode is adapted to illuminate upon the actuation thereof.

Next provided is a first charge controlled device camera 30 situated within the recess of the housing adjacent the magnetic strip reader. The first charge controlled device camera is adapted to scan the thumb print image of the credit card upon the receipt of an activation signal.

Also included is a second charge controlled device camera 32 situated on the front face of the housing adjacent the recess thereof. Upon the receipt of the activation signal and the user placing a thumb thereon, the second charge controlled device camera is adapted to scan a thumb print of the user. Details relating to the construction and operation of both charge controlled device cameras can be found in U.S. Pat. No. 5,189,482 which is incorporated herein by reference.

Next provided is an activation button 36 situated on the top face of the housing and connected to the first charge controlled device camera and the second charge controlled device camera. In use, the activation button serves to transmit the activation signal thereto upon the depression thereof. In the alternative, the second camera may be slidably situated with respect to the housing and the activation button may be situated therebeneath such that the activation signal is transmitted upon the depression of the second camera as when the thumb is placed thereon.

Finally, an image comparison means 40 is situated within the housing and connected between the first charge controlled device camera, second charge controlled device camera, red light emitting diode, green light emitting diode, and the magnetic strip reader. In operation, the image comparison means is adapted to compare the thumb print of the user and the thumb print image upon the receipt thereof from the cameras. It should be noted that the image comparison means may be equipped with a standard analog to digital and digital converter and digital comparator means for accomplishing its desire function.

Once the forgoing comparison is accomplished, the image comparison means actuates the green light emitting diode and the magnetic strip reader if the verification of the thumb print of the person with the thumb print image is successful. Further, the image comparison means is adapted to actuate the red light emitting diode and preclude the actuation of the magnetic strip reader upon the unsuccessful verification of the thumb print of the person with the thumb print image.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved credit card reader with thumb print verification means comprising, in combination:

a credit card having a thin rectangular configuration with a top face, a bottom face and a predetermined thickness, the bottom face having a thin magnetic strip with an account number stored thereon and a thumb print image situated adjacent to the magnet strip;

a housing having a rectilinear configuration with a top face, a bottom face, and a periphery formed therebetween defining an interior space, the top face of the housing having rectangular recess formed therein with the predetermined thickness, the top face further having a finger divot formed therein adjacent to and in communication with the rectangular recess, whereby the credit card may be placed within the recess with the bottom face thereof down and easily removed by way of the finger divot;

a magnetic strip reader situated within the recess of the housing for reading an account number from the magnetic strip of the credit card upon the actuation thereof;

a green light emitting diode situated on the front face of the housing and adapted to illuminate upon the actuation thereof;

a red light emitting diode situated on the front face of the housing and adapted to illuminate upon the actuation thereof;

a first charge controlled device camera situated within the recess of the housing adjacent the magnetic strip reader, the first charge controlled device camera adapted to scan the thumb print image of the credit card upon the receipt of an activation signal;

a second charge controlled device camera situated on the front face of the housing adjacent the recess thereof, the second charge controlled device camera adapted to scan a thumb print of a person upon the receipt of the activation signal and the user placing a thumb on the housing;

an activation button situated on the top face of the housing and connected to the first charge controlled device camera and the second charge controlled device camera for transmitting the activation signal thereto upon the depression thereof;

image comparison means connected between the first charge controlled device camera, second charge controlled device camera, red light emitting diode, green light emitting diode, and the magnetic strip reader, the image comparison means comparing the thumb print of the user and the thumb print image upon the receipt thereof from the cameras, the image comparison means further adapted to actuate the green light emitting diode and the magnetic strip reader upon the successful verification of the thumb print of the person with the thumb print image, the image comparison means further adapted to actuate the red light emitting diode and preclude the actuation of the magnetic strip reader upon the unsuccessful verification of the thumb print of the person with the thumb print image.

2. A credit card reader with thumb print verification means comprising:

a credit card having a thin rectangular configuration with a top face, a bottom face and a predetermined thickness, the credit card having a thin magnetic strip with an account number stored thereon and a thumb print image;

a housing with a top face, a bottom face, and a periphery formed therebetween defining an interior space, the housing having a recess formed therein with a magnetic strip reader within the recess;

an alert means situated on the housing for providing an indication upon the actuation thereof;

a first camera situated on the housing, the first camera adapted to scan the thumb print image of the credit card upon the receipt of an activation signal;

a second camera situated on the housing, the second camera adapted to scan a thumb print of a person upon the receipt of the activation signal and the user placing a thumb upon the housing;

an activation means connected to the first camera and second camera for transmitting the activation signal thereto upon the depression thereof;

image comparison means connected between the first charge controlled device camera, second charge controlled device camera, and alert means, the image comparison means adapted to compare the thumb print of the user and the thumb print image upon the receipt thereof from the cameras, the image comparison means further adapted to actuate the alert means and allow further processing upon the successful verification of the thumb print of the person with the thumb print image such further processing including the reading of the magnetic strip.

3. A credit card reader with thumb print verification means as set forth in claim 2 wherein the magnetic strip reader reads an account number from the magnetic strip of the credit card upon the actuation thereof, whereby the image comparison means is further adapted to preclude the actuation of the magnetic strip reader upon the unsuccessful verification of the thumb print of the person with the thumb print image.

4. A credit card reader with thumb print verification means as set forth in claim 3 wherein the top face of the housing has a rectangular recess formed therein with the predetermined thickness, wherein the magnetic reader is situated within the recess.

5. A credit card reader with thumb print verification means as set forth in claim 2 wherein the top face of the housing has a rectangular recess formed therein with the predetermined thickness.

6. A credit card reader with thumb print verification means as set forth in claim 5 wherein the top face of the housing further has a finger divot formed therein adjacent to and in communication with the rectangular recess, whereby the credit card may be placed within the recess and easily removed by way of the finger divot.

7. A credit card reader with thumb print verification means as set forth in claim 5 wherein the first camera is situated within the recess.

8. A credit card reader with thumb print verification means comprising:

a credit card having a thin rectangular configuration with a top face, a bottom face and a predetermined thickness, the credit card having a thin magnetic strip with an account number stored thereon and a thumb print image;

a housing with a top face, a bottom face, and a periphery formed therebetween defining an interior space, the housing having a recess formed therein with a magnetic strip reader within the recess;

an alert means is situated on the housing for providing an indication upon the actuation thereof;

a first camera situated on the housing, the first camera adapted to scan the thumb print image of the credit card upon the receipt of an activation signal;

a second camera situated on the housing, the second camera adapted to scan a thumb print of a person upon the receipt of the activation signal and the user placing a thumb upon the housing;

an activation means connected to the first camera and second camera for transmitting the activation signal thereto upon the depression thereof;

image comparison means connected between the first charge controlled device camera, second charge controlled device camera, and alert means, the image comparison means adapted to compare the thumb print of the user and the thumb print image upon the receipt thereof from the cameras, the image comparison means further adapted to read the magnetic strip upon the successful verification of the thumb print of the person with the thumb print image.

\* \* \* \* \*